Nov. 17, 1970   W. C. RUDD   3,541,296
WELDING OF LOW THERMAL MASS PARTS
Filed Nov. 2, 1967   5 Sheets-Sheet 5

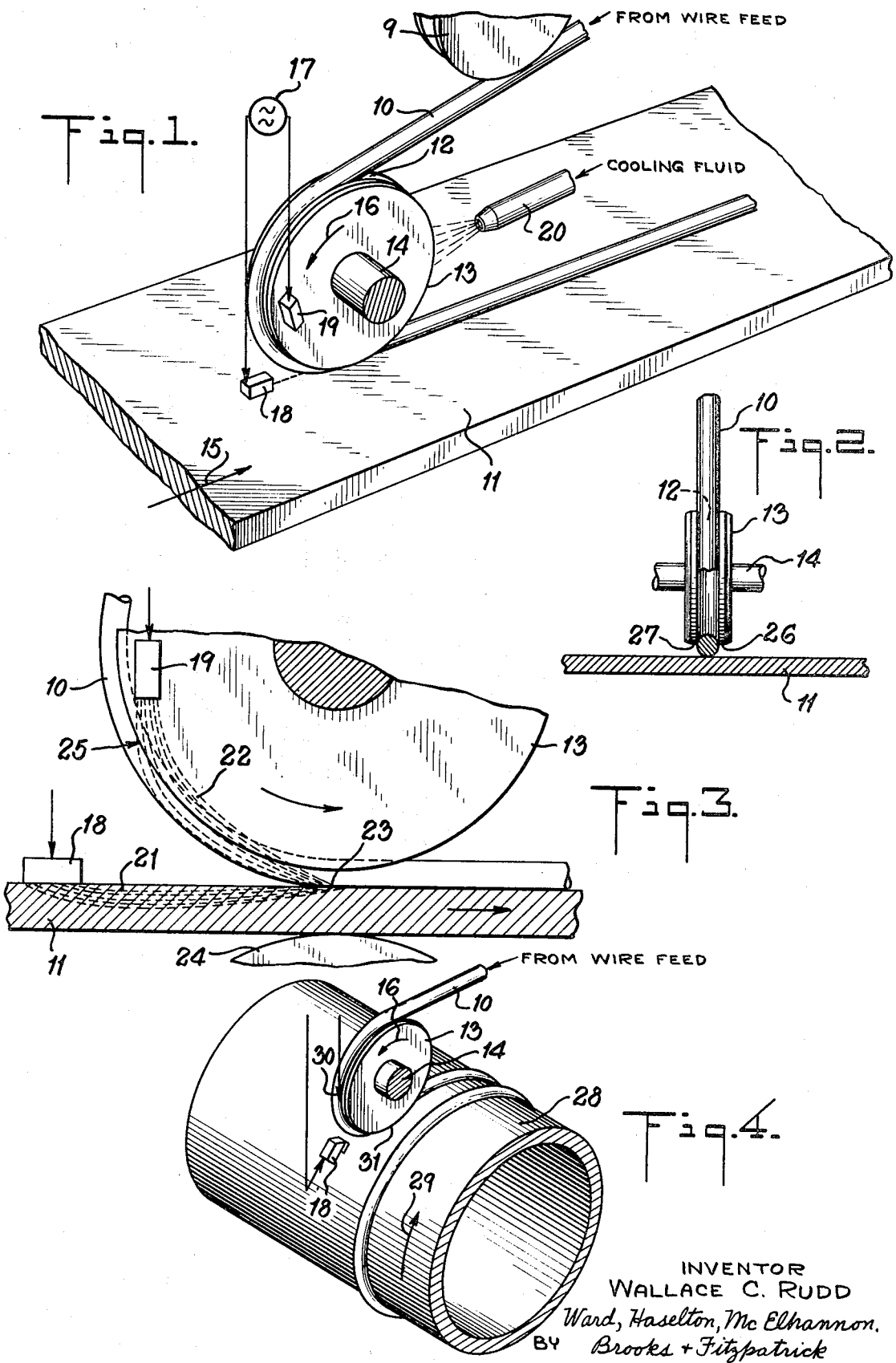

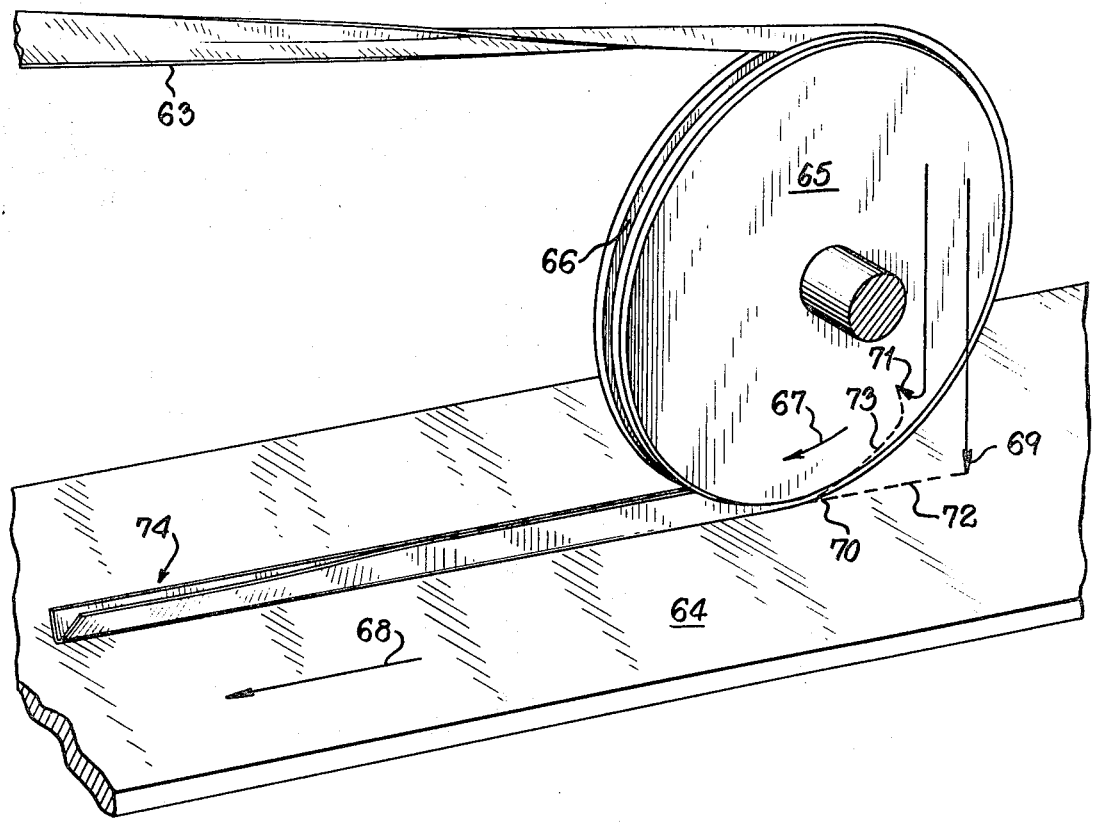
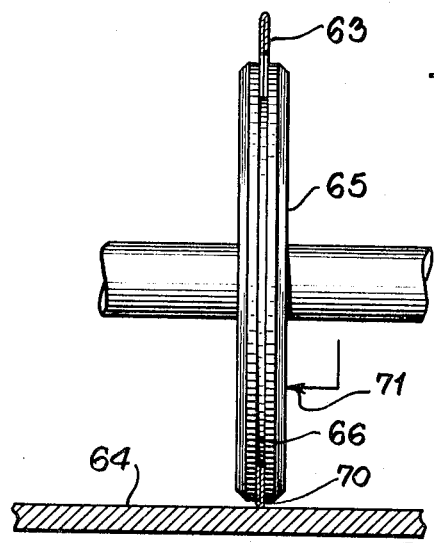

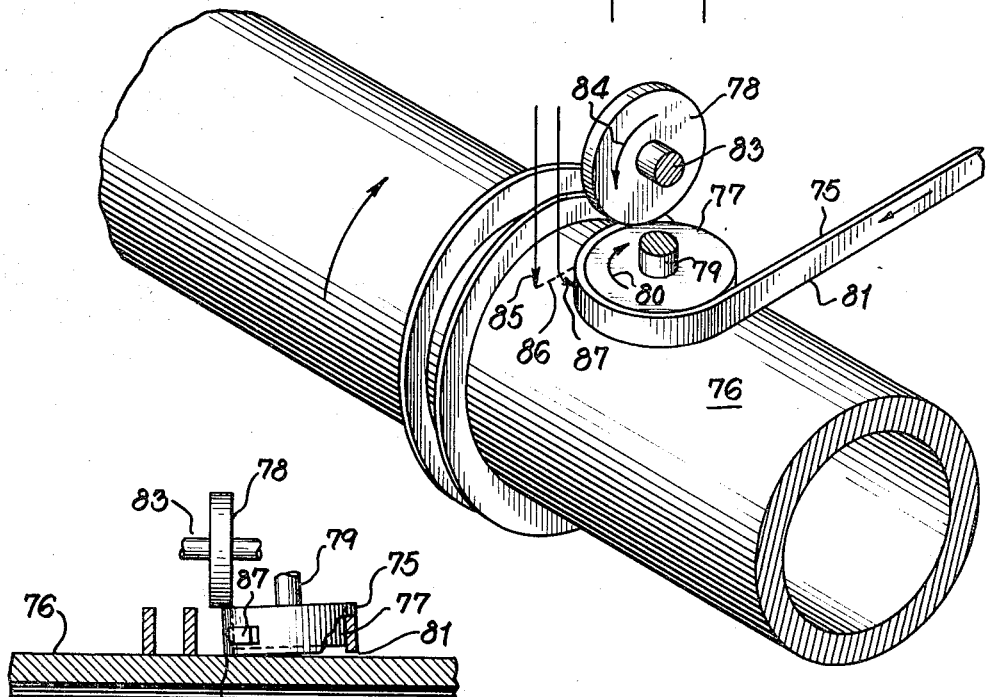
Fig. 10.
Fig. 11.
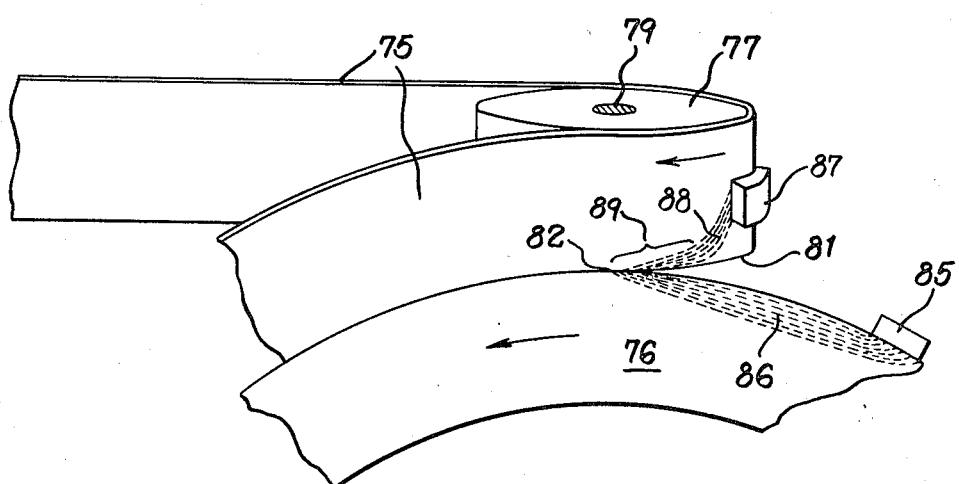
Fig. 12.
INVENTOR
WALLACE C. RUDD

INVENTOR
WALLACE C. RUDD
BY Ward, Haselton, McElhannon,
Brooks + Fitzpatrick
ATTORNEYS United States Patent Office 3,541,296
Patented Nov. 17, 1970

1

3,541,296
WELDING OF LOW THERMAL MASS PARTS
Wallace C. Rudd, Larchmont, N.Y., assignor to American Machine & Foundry Company, a corporation of New Jersey
Filed Nov. 2, 1967, Ser. No. 680,240
Int. Cl. B23k 11/00
U.S. Cl. 219—117                     26 Claims

ABSTRACT OF THE DISCLOSURE

One metal part of low thermal mass, such as a wire, rod, tube or thin strip, is welded to another metal part by bringing the parts together along converging paths which meet at or adjacent a weld point and by heating facing surfaces of the parts to welding temperature by the time they reach the weld point by supplying high frequency current to points on the parts in advance of the weld point. From the point at which current is supplied to said one part of low thermal mass up to the weld point, a substantial portion of the periphery of the one part is maintained in contact with a member of good electrical and thermal conductivity, such as a roll, which moves with the one part and which is in close proximity to the facing surface of the other part, the member acting as a heat sump and carrying part of the current.

This invention relates to the welding together of metal portions and more particularly to welding by the use of high frequency current conductively applied for heating the parts which are to be welded together.

It has become well known practice to weld portions of metal parts together while continuously advancing same in such manner that the edges, or other portions thereof which are to be welded together, are caused to approach each other with a V-shaped gap therebetween, the apex of which is at or adjacent the weld point, and while high frequency current is applied by contacts engaging the metal portions respectively at positions in advance of the weld point so that the heating current flows from such contacts to and from the weld point along on the edge surfaces of the V-shaped gap. This method has proven to be highly satisfactory such as for the longitudinal welding of metal tubing, among other types of work.

In such method, the portions to be welded together are pressed together with relatively high pressures, at the weld point, usually with rolls, and it is necessary to use rolls having a size sufficient to withstand the forces involved. Also, in such method, the electrical current flowing in one of the portions also flows in the other portion and is concentrated on the approaching faces by virtue of the proximity effect which occurs between currents flowing in opposite directions. When relatively large currents are employed to obtain high welding speeds, the distance between the points of application of the heating current and the weld point may be relatively short, which makes it difficult to supply the current at the proper points in view of the size of the pressure rolls.

The problem of applying the welding currents to the proper points is particularly great when one of the parts has a relatively low thermal mass or when the parts are of different metals which have different electrical resistances. Thus, since the same current is flowing in both parts, one part heats more rapidly that the other so that in order that both parts will be heated to the proper temperature at the weld point the current should flow in the more rapidly heating part for a shorter period of time in advance of the weld point. In addition, even though high frequency currents may be used to limit the current penetration (skin depth) in the low thermal mass part, such part usually is relatively thin and may have a thickness less than, or no greater than, the skin depth so that the part is heated by current flow throughout its thickness thereby reducing its strength and resistance to deformation. Attempts have been made to reduce such heating time by supplying the current to the more rapidly heating part at a point nearer to the weld point than the point it which current is supplied to the more slowly heating portion, and while this has been satisfactory for some applications, additional problems arise. For example, it is not always possible, because of the pressure roll size, or the magnitude of the current which would permit a high welding speed, to supply the current to the more rapidly heating part at a point near enough to the weld point to prevent overheating of such part. Also, as pointed out above, the current flowing in one part serves to concentrate the current flowing in the other part, and if the current path in one part is much shorter than the current path in the other part, the current is more spread out in the other part in advance of the point where the paths overlap, causing even slower heating of the other part and an undesirable wider heating band.

In addition, for various reasons, including uniformity of heating, it is important to control accurately the spacing between the parts, and hence the V-gap, as they approach the weld point. This is difficult to do with a low thermal mass part, which may, for example, be a wire, a small diameter tube, a rod of small cross section, or a narrow strip, and the problems are increased with such a part since it is heated throughout its thickness and loses strength as it approaches welding temperature. Thus, it may sag or stretch just prior to the weld point, and unless it is supported at this point will, in some cases, break and interrupt the welding process. In fact, it has been found to be impractical to try to weld wire having a diameter of less than 0.1 inch to another part using the prior methods.

In accordance with my invention, the above-mentioned problems are overcome by engaging the rapidly heating metal part in avance of the weld point by an electrically and thermally conductive member which moves with the part from the point of engagement therewith to the weld point, at which weld point the member presses the parts or portions together, by supplying current to such part in a manner such that the current is divided between said part and said member, by maintaining both the part and a portion of the member in close proximity to the current path in the other part or portion in advance of the weld point and by maintaining good electrical and thermal contact between said member and a substantial portion of the periphery of said part from the point at which current is supplied to said part to the weld point. In the preferred form of the invention, the member is a roll having a diameter sufficient to cause substantial overlap between the current paths on such metal part and the other part in advance of the weld point and having a face engaging said metal part over at least one-fourth of the periphery thereof, and said metal part is wrapped at least partly around said roll. Welding current is supplied to either the roll or the metal part and to the other part at points substantially in advance of the weld point; and preferably, the periphery of the roll is shaped to conform with, and to snugly engage, at least a substantial portion of the periphery of said metal part. Although the invention is primarily applicable to the welding dissimilar parts, it may also be employed in the welding of separate, similar parts such as two wires, which heat rapidly to welding temperature when large currents are employed to obtain high welding speeds.

Various further objects, features and advantages of the invention will be apparent from the detailed description of preferred embodiments thereof set forth hereinafter and from the accompanying drawings, in which:

FIG. 1 is a schematic, perspective view of an embodiment of the invention for welding a low thermal mass such as a rod, wire or tube to a flat metal strip or sheet.

FIG. 2 is an end elevation view of a portion of the embodiment shown in FIG. 1;

FIG. 3 is an enlarged, side elevation view of the embodiment shown in FIG. 1;

FIG. 4 is a schematic perspective view of an embodiment for welding a low thermal mass part to a tube or cylinder;

FIG. 8 is a schematic, perspective view of an embodiment of the invention for welding a folded strip to a metal strip or sheet;

FIG. 9 is an end elevation view of a portion of the embodiment shown in FIG. 8;

FIG. 10 is a schematic, perspective view of an embodiment for welding a low thermal mass strip to a tube or cylinder;

FIG. 11 is a fragmentary, elevation view, partly in cross section, of the embodiment shown in FIG. 10;

FIG. 12 is an enlarged, end elevation view of a portion of the embodiment shown in FIG. 10;

Figure 5:
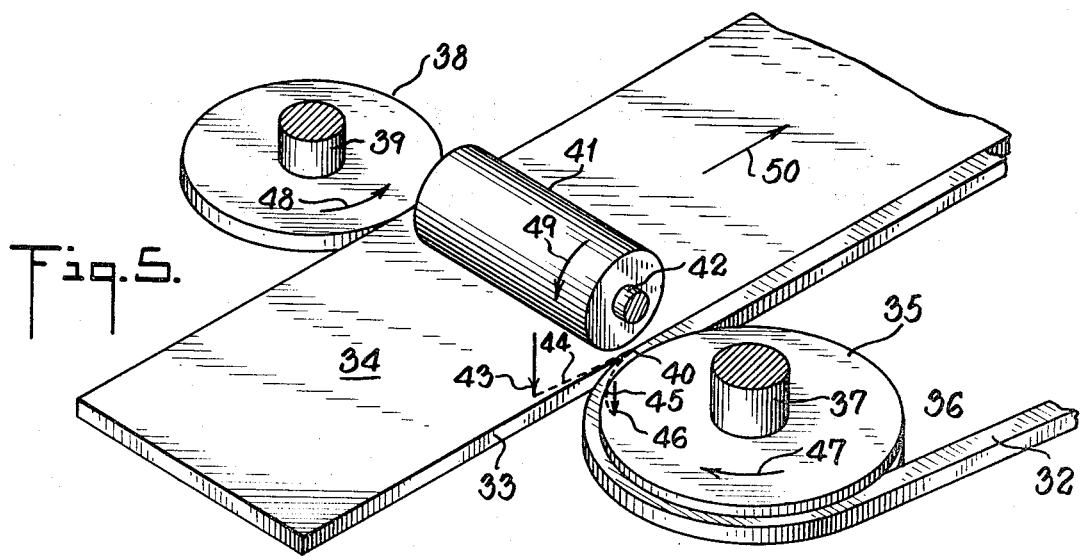
FIG. 5 is a schematic perspective view of an embodiment for welding a low thermal mass strip to the edge of a metal strip or sheet.

FIG. 1 illustrates schematically the welding of a circular metal rod or wire 10 to a flat metal strip or sheet 11, the wire 10 being received in a peripheral groove 12 and being partly wrapped around the periphery of a roll 13 which is rotatable on or with the shaft 14. The strip 11 is moved by any conventional means in the direction of the arrow 15, and the roll 13 rotates in the direction of the arrow 16. The wire 10 is fed to the groove 12 in the roll 13 by conventional means, such as a braked reel and a grooved roll 99, and is under slight tension so as to maintain it in the groove 12 and in good contact with the wall thereof. Welding current and preferably high frequency welding current, e.g., current having a frequency of 50,000 Hertz or higher, is supplied from a source 17 to contacts 18 and 19 which both engage and ride on the strip 11 and the roll 13, respectively. Although the contact 19 is shown engaging the roll 13 it may, if desired, contact the wire 10 instead at a position radially outwardly of the position of the contact 19 shown in FIG. 1.

As illustrated in FIG. 2, the peripheral groove 12 corresponds to the shape of the wire 10 and, preferably, the roll intimately engages at least one quarter of the periphery of the wire 10 from the point at which current is supplied to the wire 10 to the weld point, all as explained more fully hereinafter. The roll 13 should be made from a material having good thermal and electrical conductivity and may, for example, be made of hard copper. Preferably, the roll 13 is cooled such as by supplying a cooling fluid, e.g., air or water-soluble oil, through a nozzle 20 (FIG. 1). While the wire 10 need only be in contact with the roll 13 from substantially the point at which current is supplied to the wire 10 to the weld point, generally it is convenient for mechanical and other reasons to wrap the wire 10 around the roll 13 to the extent illustrated in FIG. 1, namely, through approximately 180 degrees.

FIG 3, which is an enlarged side view, partly in cross section, of the apparatus shown in FIG. 1, illustrates the paths of current flow by dotted lines 21 and 22. It will be seen that the wire 10 and the upper surface of the strip 11 form opposite sides of a generally V-shaped gap, the wire 10 and the strip 11 following paths which meet at a weld point or zone 23, and the current flows to and from the weld point 23 from the contacts 18 and 19. The current flows from the contact 19 downwardly toward the surface of the strip 11, rather than in a straight line to the weld point 23, due to the well-known proximity effect which causes closely spaced, oppositely flowing currents to flow close to each other. During the first part of the current path from the contact 19 to the weld point 23, the current flows substantially only in the roll 13, and thereafter more of the current flows in the wire 10 and less of the current flows in the roll 13 until a point close to the weld point 23 is reached, at which time the current flows almost entirely in the wire 10. The current flowing from the contact 19 to the weld point 23 is of the same magnitude as the current flowing from the weld point 23 to the contact 18; however, by virtue of the proximity effect, the current in the wire 10 and the strip 11 becomes concentrated on the facing surfaces of the wire 10 and the strip 11 as the wire and strip approach the weld point 23. Furthermore, for the same reason, the current path in the strip 11 is concentrated in a relatively narrow band where the surface of the strip 11 underlies the path of the current from the contact 19 to the weld point 23.

It will be noted from FIG. 3 that in the embodiment shown the lengths of the two current paths from the contacts 18 and 19 to the weld point 23 are substantially the same, and the current path in the strip 11 underlies, for most of its length, the current path from the contact 19 to the weld point 23. Although the current path from the contact 19 to the weld point 23 may be shorter if a smaller diameter roll 13 is employed of if the contact 19 is placed closer to the weld point 23, it may also be longer under conditions selected as set forth hereinafter and if a roll 13 of larger diameter is employed. It is preferred to have a substantial overlap between the current paths so as to obtain the previously mentioned concentration of the current on the high thermal mass strip 11.

The current and the longitudinal speed of the wire 10 and the strip 11 are adjusted so that the corresponding forge welding temperatures of both the wire 10 and the strip 11 are reached at the weld point 23, and at the weld point 23, the parts are pressed or squeezed together by means of the roll 13 and a supporting roll of cylinder 24 underlying the strip 11. With the arrangement shown, welding can be performed at high rates of speed, e.g., hundreds of feet per minute.

The point at which current is supplied to the rapidly heating metal part, i.e., the wire 10 of relatively low thermal mass, is dependent upon a number of factors. As a practical matter, the roll 13 must have a certain size with materials which have the necessary electrical and the thermal conductivity as well as mechanical strength in order to withstand the pressures required to force or squeeze together the parts to be welded. Thus, a minimum size is about one and one-half inches in diameter, although the roll 13 may be much larger. Provided that other conditions are met, the roll 13 preferably should have a diameter which will provide a maximum amount of overlap between the two current paths in the two parts 10 and 11 to be welded together.

In the embodiment shown in FIGS. 1-3, the current is supplied to the wire 10 approximately at the point designated by the numeral 25 (FIG. 3). From point 25 to the weld point 23 the roll 13 is in good thermal and electrical contact with a substantial portion of the periphery of the wire 10, and the roll 13, therefore, not only acts as a heat sump for the wire 10 but also as a current sharing conductor. In other words, the roll 13 absorbs heat from the wire 10 and delays its heating to the welding temperature and, in addition, for a substantial or major portion of the distance from the point 25 to the weld point 23, carries part of the current, thereby reducing the current carried by the wire 10. However, all of the current flows in the high thermal mass member or strip 11, and while all of such current heats the surface of the strip 11 to be welded, the heating of the wire 10 is retarded by the roll 13, both by virtue of its being a heat sump and its diversion of some of the current from the wire 10. Such effects of the use of the roll 13 not only prevent overheating of the wire 10 before it reaches the weld point 23 but also maintains the upper portion thereof at a lower temperature than the surface thereof facing the strip 11 so that the wire 10, as a whole, has greater strength and resistance to deformation at and prior to the weld point 23.

If the roll 13 were omitted or not positioned and maintained in contact with the wire 10 as described and if the current were supplied directly to the wire 10, all of the current would be carried by the wire 10 causing heating thereof more rapidly than the heating of the strip 11. Supplying the current to the wire 10 close enough to the weld point 23 to reduce the heating thereof sufficiently to prevent overheating of the wire 10 during its travel to the weld point is virtually impossible with certain wire sizes due to mechanical difficulties, such as the need for a roll at the weld point to squeeze the parts together, and would, if it were attainable, permit spreading of the current in the strip 11 over an undesirably wide area.

Heating of the wire 10 is controlled by the amount of engagement between the roll 13 and the wire 10, and therefore the groove 12 is shaped so as to engage a substantial portion of the periphery of the wire 10 and so as to provide good thermal contact therewith, a larger area of contact reducing heating of the wire 10. In addition, heating of the wire 10 may be retarded by lowering the temperature of the roll 13 by the use of cooling fluid as illustrated in FIG. 1.

The ability of the roll 13 to divert part of the current from the wire 10 is dependent upon the conductivity thereof as compared to the conductivity of the wire 10 and the relative positions of the periphery of the roll 13 and the wire 10 with respect to the current-carrying surface of strip 11. In the embodiment shown, the roll 13 has a pair of lands 26 and 27 which are closer to the current-carrying surface of the strip 11 than the upper portion of the wire 10 as it comes under the roll as viewed in FIG. 2, and, therefore, more current will be carried by the periphery of the roll 13 than such upper portion of the wire 10. The relative amounts of current carried by the periphery of the roll 13 and the wire 10 may be varied by varying the spacing between the lands 26 and 27 and the surface of the strip 11, the closer the lands 26 and 27 are to the strip 11 the more current they will divert from the wire 10. In the embodiment shown, the lands 26 and 27 are a fixed distance from the surface of the wire 10 which faces the surface of the strip 11 from the point 25 at which current is supplied to the wire 10 to the weld point 23. The relative amounts of current can also be varied by suitably proportioning the thickness of the lands 26 and 27 relative to the dimensions of the wire 10.

It is apparent, therefore, that, dependent upon the conditions selected and the parts being welded, the current may be supplied to the rapidly heating part 10 or the roll 13 at various points in advance of the weld point 23, i.e., from shortly in advance thereof to at least as far in advance thereof as the point to which current is supplied to the other metal part. However, in all cases, the rapidly heating metal part will be at least partly wrapped around the roll and in good contact therewith around a substantial portion of the periphery of the part for a substantial distance in advance of the weld point. As one example, apparatus found to be satisfactory for welding a round steel wire 10 having a diameter of 0.047 inch to a steel strip 11 approximately 0.050 inch thick by 1.0 inch wide employed a hard copper roll 13 having an outside diameter of 1.66 inches and a peripheral, semicircular groove 12 approximately 0.028 inch deep and having an entrance width of 0.050 inch. The roll 13 was 0.187 inch wide and the peripheral groove 12 was bordered by peripheral lands 26 and 27, 0.010 inch wide, the surface tapering at 45° angles from the outside edges of the lands to the side faces of the roll. The contact 18 on the steel strip was 9/16-inch from the weld point and the other contact 19 engaged the roll 13/16-inch from the weld point measured circumferentially of the roll 13. Electrical currents having a frequency of approximately 450 kiloHertz were used.

FIG. 4 illustrates application of the principles of the invention to the welding of the wire 10 along a helical path on the external surface of a cylindrical pipe or tube 28. The arrows 16 and 29 indicate the relative directions of rotation of the roll 13 and the pipe 28, respectively, the pipe 28 being rotated by any conventional means. Current is supplied to the wire 10 by means of a contact 30 engaging and riding directly thereon, as shown. It should be understood that contact 30 may be replaced by a contact riding directly on the roll 13 such as contact 19, shown in FIG. 1. In other respects the apparatus and mode of operation is substantially the same in FIG. 4 as in FIG. 1. Both the metal of the pipe 28 and the wire 10 will be brought to welding temperature at the point 31 of tangential pressure engagement beneath the pressure roll 13. Roll 13 again serves both to divert current from wire 10 and as a heat sump. As with the embodiment shown in FIG. 1, means may and generally will be provided for cooling roll 13. Similar apparatus may be used for welding wire or the like on the interior surface of a pipe, such as pipe 28.

In FIG. 5, a wire 32 of rectangular cross section is shown being welded to the edge surface 33 of a metal strip 34. A roll 35 of good thermal and electrical conductivity and provided with a peripheral groove 36 of rectangular cross section is rotatably mounted on a shaft 37 and applies the wire 32 against and along the edge surface 33 of strip 34. A back-up squeeze or pressure roll 38 mounted for rotation on a shaft 39 engages the opposite edge of strip 34 for cooperating with roll 35 to maintain pressure engagement between wire 32 and edge surface 33 at the welding point or zone 40. A roll 41 mounted for rotation on a shaft 42 engages the upper side of strip 34 and cooperates with a similar roll, not shown, which engages the underside of strip 34 in opposition to roll 41 for preventing buckling of strip 34.

A contact 43 engages and rides upon strip 34 near edge surface 33 supplying high frequency heating current thereto which flows generally along the path shown by the dotted line 44 to the welding point 40. The current passes to the wire 32 at point 40 and travels both along the wire 32 and along the periphery of roll 35 following the path shown generally by the broken line 45 to a contact 46 riding on the side of roll 35. It should be understood that the distribution of the current in the embodiment of FIG. 5 will be somewhat the same as that shown in greater detail in FIG. 3.

The direction of rotation of rolls 35, 38 and 41, and of travel of strip 34, is shown by arrows 47, 48, 49 and 50, respectively.

The arrangement of FIG. 5 might typically be employed in the welding of small size, high-speed steel, rectangular wire to the edge of a strip of 6135 steel as a preliminary step in the fabrication of a band saw blade. Other uses will be readily apparent.

Figure 6:
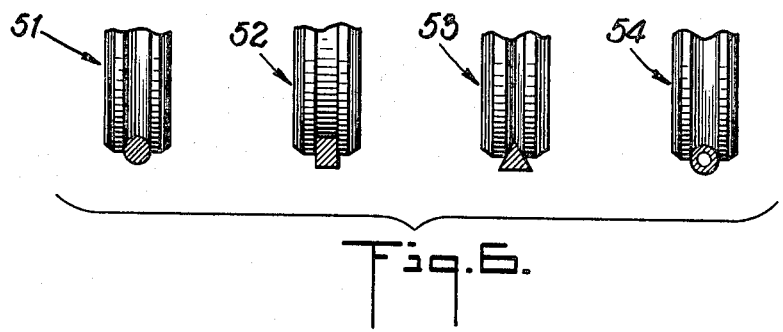
FIG. 6 shows fragmentary, end elevation views of rolls for welding low thermal mass parts of various shapes.

In FIG. 6 a series of fragmentary views illustrate the application of the invention to small cross-section material of various configuration. In each of the views the shape of the peripheral groove in the roll complements that of the wire or element it is intended to handle. The view designated generally by the numeral 51 shows a roll and circular wire that may be identical to that described with reference to FIGS. 1–3. A roll with a rectangular groove which might be employed in the embodiment of FIG. 5 is shown generally at 52. At 53 there is shown an arrangement for welding triangular wire while the view at 54 shows how to handle circular tubing. The general principles apparent from FIG. 6 may be extended to elements of various other configurations.

Figure 7:
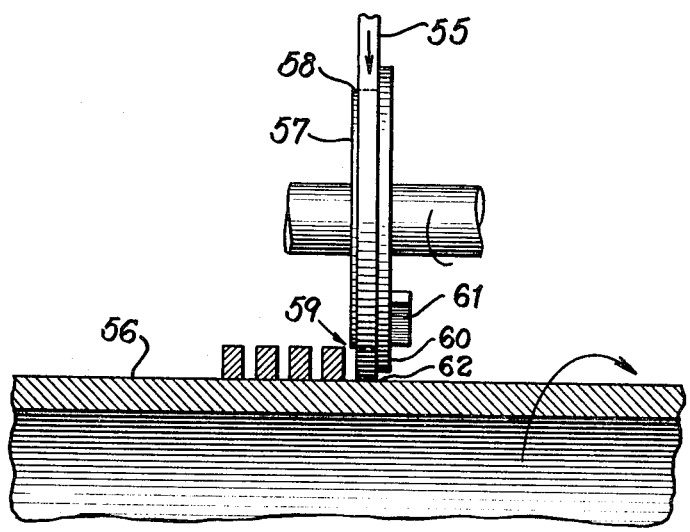
FIG. 7 is an end elevation view, partly in cross section, of an embodiment for welding strip in close spaced relation to a tube.

Grooved rolls of the type described above impose a limitation upon the minimum side-by-side spacing of welded wire. A solution to this problem is shown in FIG. 7 where it is desired to weld a very small rectangular rod or strip 55 with a very close or small pitch along a helical path on the outside of a pipe 56 to form fins or threads thereon. Here the roll 57 is provided with a peripheral surface 58 and a lip 60 for engaging and guiding the rectangular rod 55. A lip corresponding to the lip 60 is omitted from the side 59 so as to permit close spacing of, or contact between, the turns of the rod 55 on the pipe or tube 56. Preferably, the surface 58 is at least as wide as the rod 55, but it may be no wider than or slightly narrower than the width of the rod 55 when the turns abut each other.

As with the previously described embodiment, high frequency heating current is supplied to wire 55 by virtue of its contact with conductive roll 57 engaged by contact 61. The periphery of roll 57 represented by its lip 60 will carry a portion of the current between contact 61 and the weld point 62 at the point of tangency between wire 55 and pipe 56. Roll 57 will also serve as a heat sump. It should be understood that current will flow to and from the welding point in much the same manner as described with reference to FIG. 3.

FIGS. 8 and 9 show the invention applied to handling and welding a very thin metal ribbon 63 which is folded upon itself by well-known means (not shown) and welded at an edge surface, e.g., the outside surface of the bight, to a metal strip 64. The folded ribbon 63 passes around the roll 65 within the peripheral groove 66, here shown as rectangular. Roll 65 rotates in the direction of the arrow 67 while the strip 64 travels in the direction of arrow 68. A contact 69 riding on strip 64 in advance of the weld point 70 cooperates with a contact 71 riding on the side of roll 65, also in advance of the weld point 70, in supplying high frequency welding current which follows the path shown generally by the broken lines 72 and 73. For illustrative purposes the fin 63 is shown combed open in the region 74 by means not shown but well understood in the art. The same arrangement may be used to weld the free edges of the folded ribbon, rather than center surface of the bight, to the strip 64. It is also possible by this arrangement to weld a folded fin around a curved or cylindrical surface.

The general concept of feeding the low thermal mass material around a roll which functions as a heat sump and a current diverter can be extended to the embodiment shown in FIGS. 10–12. The low thermal mass material is a small strip or ribbon 75 shown being welded as a spiral fin to a tube or pipe 76. One of the problems in welding such a fin to a tube is to keep the fin stiff and reasonably vertical without wrinkling while it is being pressed against the tube wall and, at the same time, being wound spirally around the tube. Heretofore, a grooved roll in a vertical plane and gripping the strip on both sides has been used to guide and press the strip, but this arrangement is confronted with considerable friction between the fin and the sides of the groove, and it is very difficult to locate the electric contact in close to the weld point.

As shown in FIGS. 10–12, the strip 75 is fed around a roll 77 and under a squeeze roll 78, the latter functioning to press the edge surface of the strip against the surface of the tube 76 as best seen in FIG. 11. Roll 77 is formed of good thermally and electrically conductive material and is mounted on shaft 79 for rotation in the direction of arrow 80. As seen in FIG. 11, the axis of shaft 79 is canted slightly so that the plane of rotation of the roll 77 is at an acute angle to the surface of the tube 76 and so that the bottom edge 81 of strip 75 is guided from a point spaced from the surface of tube 76 down toward the surface, contacting same at the weld point 82 (best seen in FIG. 12).

The roll 78 is mounted on a shaft 83 for rotation in the direction of the arrow 84. Roll 78 engages the upper edge of strip 75 just above the weld point 82.

High frequency heating current may be supplied to the tube 76 by a contact 85 engaging and riding thereupon in advance of the weld point. Current will flow generally along a circumferential path to the weld point as shown by the dotted lines 86. Another contact 87 may engage and ride on the strip 75 at a point where the strip is backed up by the roll 77 or it may engage and ride upon the roll 77 at about the same position. Current between the weld point 82 and contact 87 will generally follow the path shown by the dotted lines 88 in FIG. 12. At least in the region 89 where the lower edge 81 of strip 75 is in approximate juxtaposition to the path 86 followed by the current between contact 85 and the weld point 82, the proximity effect will tend to concentrate the current in the tubing 76 as well as near the lower edge 81 of strip 75.

As with the previously described embodiments, the roll 77 may be cooled and functions as a heat sump. Furthermore, when the strip 75 is thin and the current is supplied to the strip 75 as shown, the current between contact 87 and weld point 82 will penetrate the strip and flow in part through the periphery and/or the edge of roll 77. Current will also flow in part through the roll 77 when the contact 87 engages it rather than the strip 75.

In the illustration of FIGS. 10–12 the strip 75 is shown wrapped approximately 180° around the roll 77 which aids in controlling the feeding of the strip and pressing it at the weld point. However, it should be apparent that the benefits of the invention may still be obtained with substantially less than 180° engagement between roll 77 and strip 75. The extent of engagement need only be sufficient to enable suitable location of the contact 87 and to stiffen the strip 75.

In the co-pending application of Rudd and Morris entitled "Welding of Seams by High Frequency Heating Current While Forcing Welding Metal into the Seam," Ser. No. 547,942 and filed May 5, 1966, apparatus and methods are described for producing butt welded seams using a wire or foil to complete the seam in applications where it is difficult or impractical to apply sufficient pressure to the members being butt welded to produce the desired weld. The present invention is particularly suitable for carrying out the invention described in said application and avoids difficulties arising from thermal elongation and buckling of a heated filled strip and from feeding a softened strip under tension to the weld point.

Figure 13:
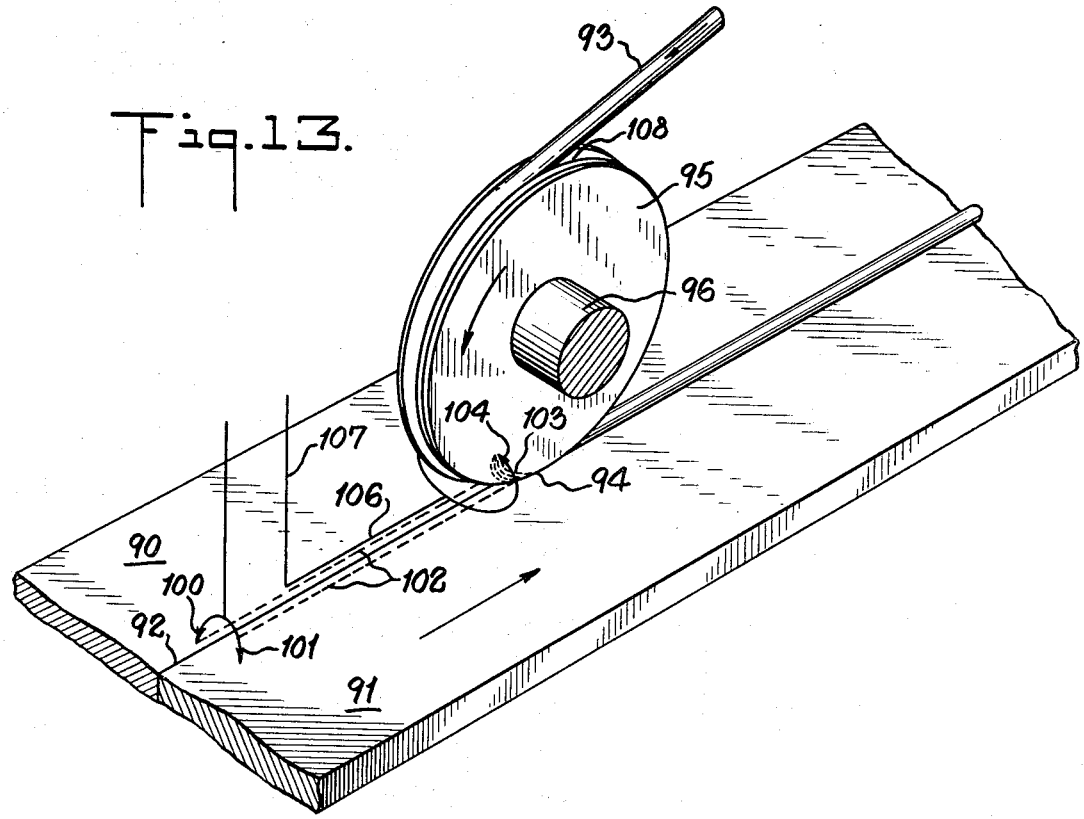
FIG. 13 is a schematic, perspective view of an embodiment of the invention for performing foil welding.
Figure 14:
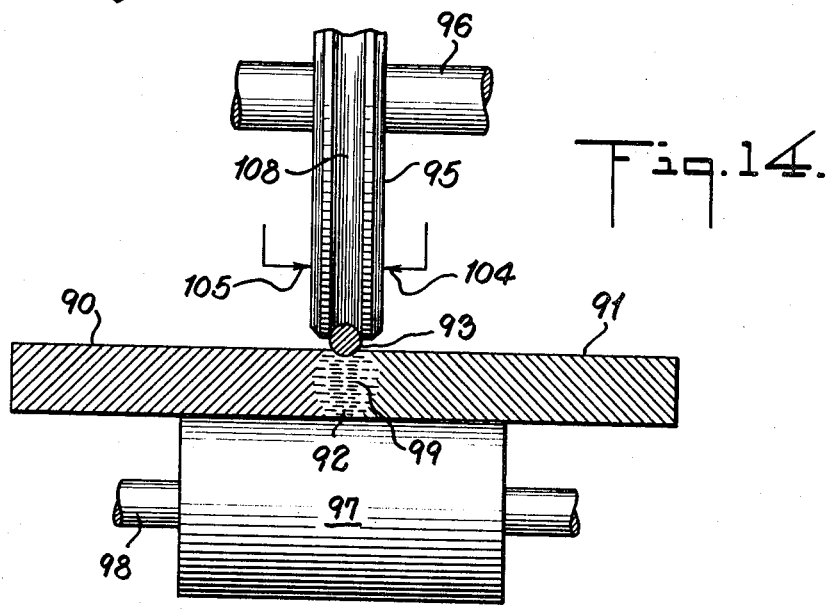
FIG. 14 is an enlarged, end elevation view of a portion of the embodiment shown in FIG. 13.

FIGS. 13 and 14 show one form of apparatus for butt welding a pair of plates or strips 90 and 91 along a seam line 92 with the aid of a filler strip 93.

In general, heat is applied to the adjacent edges of strips 90 and 91 in advance of a zone or point of welding designated generally by the reference numeral 94. A pressure roll 95 rotatably mounted on a shaft 96 applies the filler strip 93, which is here a circular wire, under pressure to one side of the seam line 92 in opposition to a back-up roll 97 rotatably mounted on shaft 98 (see FIG. 14). By means to be described the zone shown by the broken lines 99 in FIG. 14, as well as the filler strip 93, will be at welding temperature at the welding point 94. Thus, the edge of the plates 90 and 91 will be compressed against the roll 97, blending and fusing along the seam line 92, while the depression that would otherwise exist due to such displacement of the metal of the plates and omission of the strip 93, is filled by the metal of the strip 93.

A pair of contacts 100 and 101 ride on the plates 90 and 91 on opposite sides of the seam line 92. High freqency heating current is supplied to contacts 100 and 101 in parallel and traverses a path within plates 90 and 91 indicated by the broken lines 102 from contacts 100 and 101 to the weld point 94. The current path then crosses to the strip 93 and roll 95 following a path shown by the broken lines 103 to a pair of contacts 104 and 105 riding on roll 95. The contacts 104 and 105 are connected in parallel and to an elongated conductor or proximity wire 106 extending for a suitable distance over and along parallel to the seam line 92 in spaced relation thereto. The conductor 106 is connected at its free end by a suitable lead 107 to the source of current, not shown. From FIG. 14 it will be noted that the roll 95 is provided with a peripheral groove 108 which embraces strip 93. In the same manner as the roll 13, the roll 95 functions both as a heat sump and to divert a portion of the current from strip 93.

The proximity conductor 106 will concentrate the current in plates 90 and 91 along and adjacent to the seam line 92 up to the point where the current flowing in strip 93 and the periphery of roll 95 becomes effective for that purpose. In this manner, although the same current flows over path 103 as over path 102, considerably more heat will be developed in the edges of plates 90 and 91 in advance of the weld point than will be developed in the filler strip 93. This becomes a practical necessity when a filler strip of low thermal mass is employed.

While a circular filler strip has been shown in FIGS. 13 and 14, other configurations may be used, e.g., square triangular, or rectangular. The arrangement of roll and strip will then be similar to that described with reference to FIG. 6.

In some of the embodiments described herein, the contact or contacts for supplying high frequency current to the low thermal mass part have been shown as engaging the roll whereas in other embodiments the contact or contacts have been shown as engaging the part. Because of the ease in which the apparatus may be made using a contact engaging the roll and the uniformity of contact which may be thereby obtained, it is preferred to use a contact engaging the roll, but it will be apparent that in any of the embodiments the contacts may engage either the roll or the part or both. Furthermore, the invention is applicable not only to the welding of low thermal mass parts to flat sheets or strips and to tubes or pipe but also to another part of similar thermal mass, curved sheets or sheets of other configurations and to solid cylinders or solid members having cross-sectional shapes other than a circle. Also, the low thermal mass part may be of the same metal or a metal different from the metal of the part to which it is welded. Although only a single layer of low thermal mass material on another part has been shown, it will be apparent that multiple layers may be applied using the invention with each succeeding layer welded to and on top of the preceding layer.

Although it is preferred to utilize high frequency current, i.e., 50,000 Hertz or higher, because of the various advantages thereof, lower frequencies may be employed in some cases. Also, if intermittent welds, rather than a continuous weld, are desired, pulses of current, either high or low frequency, may be used.

Typical applications of the invention are, for example, building up or repair of a forging, hard surfacing of parts, forming a thread or guide on surfaces, forming laminated parts with different properties in different areas, such as saw blade, a gear blank, etc., stiffening or reinforcing shafts, tubes and pipes, e.g., ducts, gun barrels, adding a spacing or anchoring element to various parts, making heat exchanger tubing with fins, and welding two sheets, bars, strips or wires together.

As used hereinafter in the claims, the expression "elongated, low thermal mass part" is intended to include wire, rod, strip and tube which has relatively small cross-sectional dimensions, i.e., a cross-sectional metal area, exclusive of any bore therein, of about one square inch.

Having thus described the invention with particular reference to the preferred form thereof, it will be obvious to those skilled in the art to which the invention pertains, after understanding the invention, that various changes and modifications may be made therein without departing from the spirit and scope of the invention, as defined by the claims appended hereto.

That which is claimed is:

1. Method for welding a first metal part to a second metal part, said first part having a lower thermal mass than said second part, comprising: advancing said parts with facing surfaces following paths which meet at or adjacent a weld point and which are spaced apart but in close proximity in advance of said weld point; supplying electrical heating current at a frequency of at least 50 kilohertz to a first point on said first part and to a second point on said second part, both points being in advance of said weld point, whereby such current flows from said points to and from said weld point and along said facing surfaces for heating said facing surfaces to welding temperature upon reaching said weld point; pressing said parts together at said weld point; and, throughout the length of the first part that extends from said first point up to the weld point maintaining a thermally and elecrically conductive roller member in thermal and electrical contact with said first part, and with a portion of said first part farther from the facing surface of said second part than a portion of said roller member, whereby throughout a portion only of the length of said first part said current flows both in the periphery of the roller member and in said first part, and whereby said roller member is of higher thermal mass than said first part and acts as a heat sump for the portion of the first part in contact therewith.

2. Method according to claim 1 wherein said first part is maintained in contact with at least one quarter of the periphery of said roller member, and further comprising supplying a cooling fluid to said roller member.

3. Method according to claim 1 further comprising positioning said roller member so that it directs said first part along a path which converges with the path of said second part and presses said first part against said second part at said weld point.

4. Method according to claim 1 wherein said portion of said roller member is maintained substantially at a fixed distance from said surface of said first part from said first point to the weld point.

5. Method according to claim 1 wherein said roller member is maintained in contact with said first part in advance of said first point.

6. Method according to claim 1, wherein current is supplied to said roller member at a point adjacent said first part and in advance of said first point whereby said first part derives its current supply from said roller member by virtue of its contact therewith, and wherein said portion of said roller member is proportioned and located relative to both of said metal parts so as to conduct said part of the current which flows along said roller member over a path which is substantially parallel to the path of current in said first part for at least a major portion of the latter path, whereby the current in said member functions jointly with the current in said first part to concentrate the current in said second part adjacent the facing surface thereof along a welding line.

7. Method according to claim 1, wherein said roller member is in the form of a peripherally grooved roll and said first part is caused to ride in the groove of said roll in intimate contact therewith and follows the contour of the roll at least for a distance equal to the distance beween said weld point and said first point.

8. Method according to claim 7, wherein said portion of said roller member is constituted by the part of said roll which forms the side walls of the groove therein.

9. Method according to claim 8, wherein current is supplied to a side of said roll adjacent the periphery thereof at a point slightly in advance of said first point whereby said first part derives its current supply from said roll by virtue of its contact therewith, and wherein said side walls of the groove are proportioned and located relative to both of said metal parts so as to conduct said part of the current which flows along said member over a path which is substantially parallel to the path of current in said first part for at least a major portion of the latter path, whereby the current in said side walls of the groove functions jointly with the current in said first part to concentrate the current in said second part adjacent the facing surface thereof along a welding line.

10. Method according to claim 1 wherein said parts are long relative to their widths and said second part has a cross-sectional area which is large relative to the cross-sectional area of said first part and wherein said parts are advanced in the direction of their lengths.

11. Method according to claim 10 wherein said second part is a metal strip and said first part is an elongated, low thermal mass part.

12. Method according to claim 11 wherein said second part is wide relative to its thickness and the facing surface of said second part is an edge surface thereof.

13. Method according to claim 10 wherein said first part is a strip which is wide relative to its thickness and the facing surface of said first part is an edge surface thereof.

14. Method according to claim 10 wherein said first part is a strip which is wide relative to its thickness and which has been folded intermediate its edges to form a bight extending lengthwise thereof and wherein the facing surface of said first part is an edge surface of the folded strip.

15. Method according to claim 14 wherein said edge surface is the outer surface of said bight.

16. Method according to claim 1 wherein said second part is rotatable and said first part is an elongated, low thermal mass part and wherein the facing surface of said second part is a peripheral surface thereof, said second part is rotated to advance said facing surface thereof and said first part is advanced helically thereof.

17. Method according to claim 1 further comprising advancing a third metal part with a surface thereof adjacent the facing surfaces of said first and second parts and following a path meeting the facing surface of said first part at the weld point, supplying said current to a point on said surface of said third part in advance of said weld point and supplying current to said point on said first part through a conductor which extends from adjacent said last-mentioned point to adjacent said point at which current is supplied to said third part and in close proximity to, but out of electrical contact with, said surface of said third part and said facing surface of said second part.

18. Method for welding a first metal part to a second metal part, said first part having a lower thermal mass than said second part, comprising: advancing said parts with facing surfaces following paths which meet at or adjacent a weld point and which are spaced apart but in close proximity in advance of said weld point; said first part being advanced in a curved path around a substantial portion of the periphery of a grooved, electrically and thermally conductive pressure roller; supplying electrical heating current to a first point on said first part and to a second point on said second part, both points being in advance of said weld point, whereby said current flows from said points to and from said weld point and along said facing surfaces for heating said facing surfaces to welding temperature upon reaching said weld point; pressing said parts together at said weld point by pressure applied by the pressure roller; and, from said first point up to the weld point maintaining said first part in thermal and electrical contact with a substantial portion of the periphery of said pressure roller, whereby part of said current also flows along the periphery of said pressure roller which acts as a heat sump for the portion of said first part which is in contact therewith.

19. Method claimed in claim 18 and including supplying electrical current to said roller member at a point adjacent said first part and beyond said first point in a direction away from the weld point, whereby the roller member and first part jointly conduct current for a portion of the length of the first part between the first point and the weld point.

20. Apparatus for welding a first metal part of low thermal mass to a surface of a second metal part of higher thermal mass comprising means for advancing said surface along a predetermined path, an electrically and thermally conductive rotatable roll having a peripheral groove for receiving said first part therein and shaped so as to engage a substantial portion of the periphery of said first part, the depth of said groove being less than the thickness of said first part in the direction radially of said roll whereby a surface of said first path is spaced radially outwardly of the periphery of said roll, said roll being mounted with its periphery adjacent to, but spaced from, said path and the bottom of said groove being spaced from said path at the portion thereof closest to said path a distance less than said thickness of said first part so as to cause said surface of said first part and said surface of said second part to meet at a weld point, said roll also being mounted for rotation in a plane that includes said path and said weld point, means for supplying electrical heating current to said first part at said periphery of said roll and in advance of said weld point and to said second part in advance of said weld point, and means for feeding said first part into said groove in advance of said weld point and at an angle to said path and for maintaining a substantial portion of the periphery of said first part in contact with the wall of said groove at least from the point at which current is supplied to said first part to said weld point.

21. Apparatus according to claim 20 wherein said means for supplying electrical heating current comprises a first contact engaging said roll at the periphery thereof in advance of said weld point and a second contact engageable with said surface of said second part in advance of said weld point.

22. Apparatus according to claim 20 wherein said first part is an elongated, low thermal mass part and said surface of said second part is the surface of a cylinder rotatable about its axis and wherein said means for advancing said surface of said second part comprises means for rotating said second part about said axis.

23. Apparatus according to claim 20 further comprising means for advancing a third metal part with a surface thereof adjacent to said surface of said second part and advancing along a path extending to said weld point, means for supplying said current to a point on said third part in advance of said weld point and adjacent to the point at which current is supplied to said second part and a conductor for supplying current to said first part which extends from adjacent said last-mentioned point to adjacent the point at which current is supplied to said first part and in close proximity to, but out of electrical contact with, said surfaces of said second and third parts.

24. Apparatus for welding a first metal part of low thermal mass to a surface of a second metal part of higher thermal mass comprising means for advancing said surface along a predetermined path, an electrically and thermally conductive rotatable roll having a peripheral surface for receiving said first part and a lip at one side of said surface extending radially outwardly therefrom, said surface and said lip being shaped so as to engage a substantial portion of the periphery of said first part, the height of said lip from said peripheral surface being less than the thickness of said first part in the direction radially of said roll whereby a surface of said first part is spaced radially outwardly of the periphery of said lip, said roll being mounted with its periphery adjacent to, but spaced from, said path and said peripheral surface being spaced from said path at the portion thereof closest to said path a distance less than said thickness of said first part so as to cause said surface of said first part and said surface of said second part to meet at a weld point, said roll also being mounted for rotation in a plane that includes said path and said weld point, means for supplying electrical heating current to said first part at said periphery of said roll and in advance of said weld point and to said second part in advance of said weld point, and means for feeding said first part into engagement with said peripheral surface and said lip in advance of said weld point and at an angle to said path and for maintaining a substantial portion of the periphery of said first part in contact with said peripheral surface and said lip at least from the point at which current is supplied to said first part to said weld point.

25. Apparatus for welding a metal strip of low thermal mass at one edge thereof to the surface of a metal part having a higher thermal mass comprising means for advancing said surface along a predetermined path, an electrically and thermally conductive rotatable roll having a peripheral surface for engaging said strip over a substantial portion of a side face thereof, said roll being mounted with said peripheral surface adjacent to said path and being mounted for rotation in a plane approximately parallel to said surface of said part, whereby said one edge of said strip is guided by said roll from a relatively widely spaced relation with respect to said last-mentioned surface to a contacting relation therewith at a weld point, means for supplying electrical heating current to said strip at said periphery of said roll and in advance of said weld point and to said surface of said part in advance of said weld point, means for engaging the opposite edge of said strip and pressing said one edge against said surface of said part at said weld point, and means for feeding said strip against said peripheral surface in advance of said weld point and for maintaining a substantial portion of said side face of said strip in contact with said peripheral surface at least from the point at which current is supplied to said strip to said weld point.

26. Apparatus according to claim 25 wherein said part has a cylindrical surface, said means for advancing said surface comprises means for rotating said part, said roll is positioned with a portion of its peripheral surface in close proximity to said weld point and with its plane of rotation at an acute angle with respect to the axis of rotation of said part and said means for feeding said strip is positioned so as to wrap said strip at least partly around said roll.

References Cited
UNITED STATES PATENTS

| | | | |
|---|---|---|---|
| 2,281,805 | 5/1942 | Schenk | 219—106 |
| 3,047,712 | 7/1962 | Morris | 219—107 |
| 3,053,971 | 9/1962 | Busse | 219—107 |
| 3,319,040 | 5/1967 | Rudd | 219—107 X |
| 3,359,402 | 12/1967 | Rieppel | 219—117 |
| 3,362,058 | 1/1968 | Morris et al. | 219—107 |
| 3,427,427 | 2/1969 | Rudd | 219—107 |
| 3,435,183 | 3/1969 | Vagi | 219—107 |
| 2,647,981 | 8/1953 | Wogerbauer | 219—59 |
| 3,377,459 | 4/1968 | Brown et al. | 219—107 |

JOSEPH V. TRUHE, Primary Examiner

L. A. SCHUTZMAN, Assistant Examiner

U.S. Cl. X.R.

219—59, 67